United States Patent [19]

Dettinger

[11] Patent Number: 4,670,975

[45] Date of Patent: Jun. 9, 1987

[54] TOOL FOR PULLING A TUBE SECTION FROM A TUBE SHEET

[75] Inventor: Heinrich Dettinger, Hanau, Fed. Rep. of Germany

[73] Assignee: Kraftwerk Union Aktiengesellschaft, Mülheim, Fed. Rep. of Germany

[21] Appl. No.: 757,627

[22] Filed: Jul. 22, 1985

[30] Foreign Application Priority Data

Jul. 26, 1984 [DE] Fed. Rep. of Germany ... 8422476[U]

[51] Int. Cl.⁴ .............................................. B23P 19/04

[52] U.S. Cl. ....................................... 29/726; 29/252; 254/29 A

[58] Field of Search ............... 29/252, 726; 254/29 A, 254/30, 105

[56] References Cited

U.S. PATENT DOCUMENTS

| | | | |
|---|---|---|---|
| 3,938,427 | 2/1976 | Warrington | 254/29 A X |
| 4,015,821 | 4/1977 | Warrington | 254/29 A |
| 4,095,335 | 6/1978 | Lassarat | 29/252 X |
| 4,366,617 | 1/1983 | Nanstiel et al. | 29/252 X |
| 4,438,901 | 3/1984 | Reneau et al. | 254/29 A |

*Primary Examiner*—Frederick R. Schmidt
*Assistant Examiner*—Steven P. Schad
*Attorney, Agent, or Firm*—Herbert L. Lerner; Laurence A. Greenberg

[57] ABSTRACT

A tool for pulling heating tube sections from a tube sheet of a steam generator, includes a threaded pulling mandrel screwed to the heating tube section, a mounting plate fixed to the tube sheet, a hydraulic linear drive having a cylinder fastened to the mounting plate and a first lifting piston, a hydraulic clamping means having a cylinder surrounding the mandrel and being fastened to the first lifting piston, wedge-shaped clamping jaws having wide and narrow ends and being movable in longitudinal direction of the mandrel for engaging the clamping piston with the mandrel, and second and third hydraulic lifting pistons of the clamping piston, the second lifting piston resting against the narrow ends and the third lifting piston resting against the wide ends of the clamping jaws.

1 Claim, 1 Drawing Figure

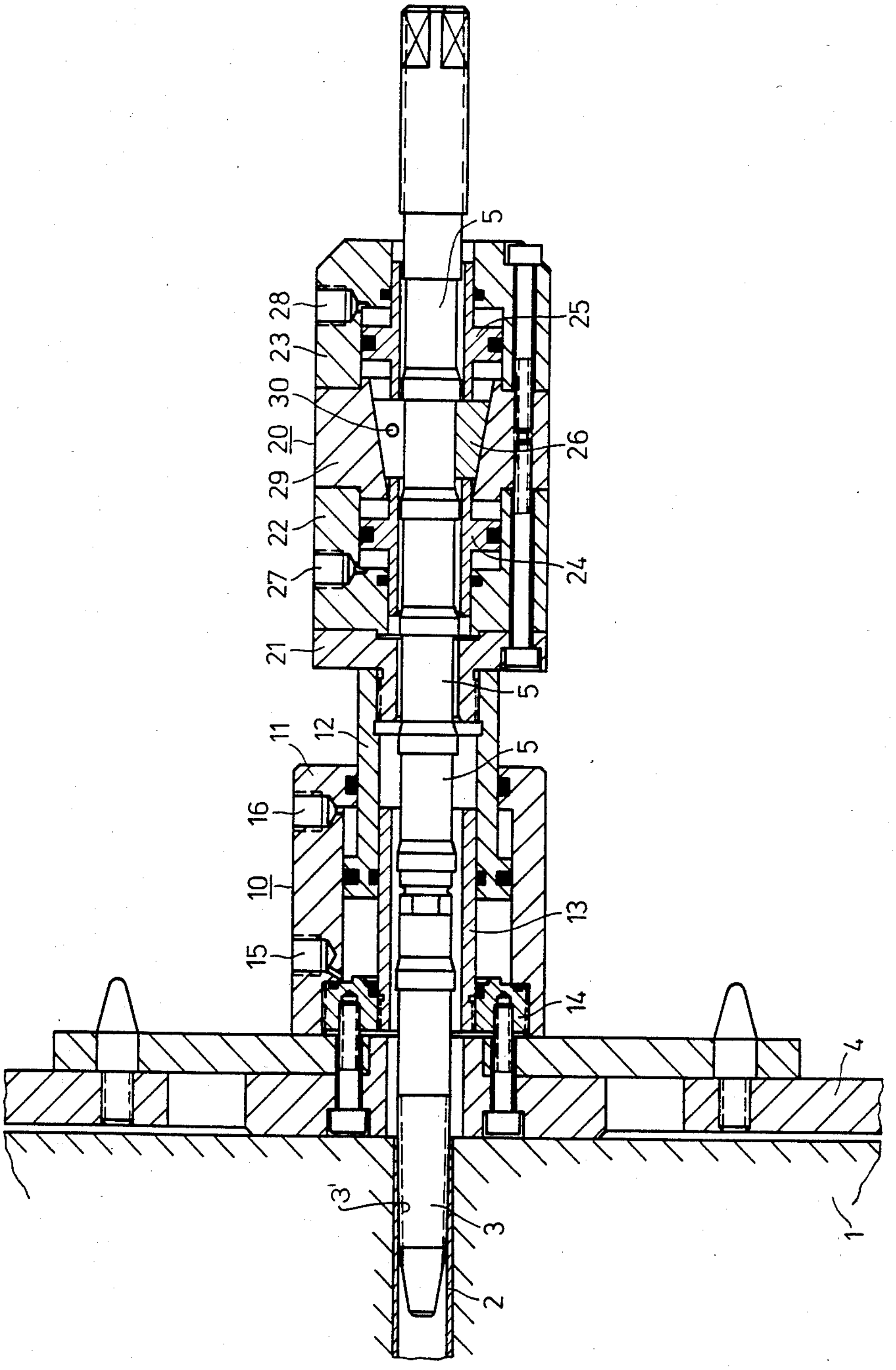
5
28
23
30
20
29
22
27
21
25
26
24
5
11
12
5
16
10
15
13
14
4
3'
3
2
1

TOOL FOR PULLING A TUBE SECTION FROM A TUBE SHEET

The invention relates to the mechanical construction of a tool with which heating tube sections can be pulled from the tube sheet of a steam generator. One conventional tool of this kind is formed of a pulling mandrel which can be screwed into the heating tube and a hydraulic linear drive which is braced against the tube sheet and engages the free end of the pulling mandrel. The pulling mandrel is firmly connected to the cylinder of the hydraulic drive. The lifting piston of the hydraulic drive is braced against the tube sheet; the tool as a whole can be operated by hand. In this tool, the hydraulic drive is provided with a relatively large stroke so that the section of the heating tube can be pulled out of the tube sheet as far as possible with each stroke. Then the pulled-out heating tube section is removed from the pulling mandrel, the form-locking connection between the pulling mandrel and the cylinder of the hydraulic drive must be released manually. A form-locking connection is one in which parts are locked together by virtue of their own shape.

It is accordingly an object of the invention to provide a tool for pulling a tube section from a tube sheet, which overcomes the hereinafore-mentioned disadvantages of the heretofore-known devices of this general type, which can be operated under remote control and with which the pulling mandrel can be removed from the tool without special installation measures.

With the foregoing and other objects in view there is provided, in accordance with the invention, a tool for pulling heating tube sections from a tube sheet of a steam generator, comprising a threaded pulling mandrel screwed to the heating tube section, a mounting plate fixed to the tube sheet, a hydraulic linear drive having a cylinder fastened to the mounting plate and a first lifting piston, a hydraulic clamping piston having a cylinder surrounding the free end of the mandrel and being fastened to the first lifting piston, wedge-shaped clamping jaws having wide and narrow ends and being movable in longitudinal direction of the mandrel for engaging the clamping piston with the mandrel, and second and third hydraulic lifting pistons of the clamping piston, the second lifting piston resting against the narrow ends and the third lifting piston resting against the wide ends of the clamping jaws.

If a tool constructed in this manner is used, a substantially shorter dwelling time of the operating personnel in the corresponding chamber of a heat exchanger is obtained. This is of importance particularly for heat exchangers in nuclear power generating stations in order to keep the radiation exposure of the operating personnel as low as possible. By using the hydraulic clamping piston, the tool can be remotely controlled without further manual intervention after it is fixed to the tube sheet.

Furthermore, after a tube section is pulled from the tube sheet, the pulling mandrel can be removed from the tool without interfering with the function of the pulling tool while the clamping piston is in the released state. Otherwise, the respective tube section can still be pulled if the tube end with the screwed-in pulling mandrel has already passed the clamping jaws. If the respective tube section cannot be pulled from the tube sheet as a whole because the empty space under the pulling tube is not sufficient for this purpose, part of the tube section can be separated directly below the pulling tube and subsequently, the remaining part can be pulled without using the pulling mandrel.

By fixing the pulling mandrel in the heating tube section, as long as the heating tube section is still located in the tube sheet over part of its length, as well as through the use of the clamping piston, the pulling mandrel is pulled step by step from the tube sheet in several successive steps of the hydraulic linear drive.

In accordance with a concomitant feature of the invention, the mandrel has cylinder ring-shaped recesses formed therein being staggered in the longitudinal direction of the mandrel for receiving the clamping jaws. This is done in order to assure a secure anchoring of the clamping jaws of the clamping piston at the pulling mandrel.

Other features which are considered as characteristic for the invention are set forth in the appended claims.

Although the invention is illustrated and described herein as embodied in a tool for pulling a tube section from a tube sheet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a fragmentary, diagramaatic, cross-sectional view of the tool of the invention.

Referring now to the single figure of the drawing in detail, there is seen a tube sheet 1 of a heat exchanger, in which the end of a heating tube 2 is disposed. One end of a pulling mandrel 3 with diagrammatically illustrated threads 3' is screwed into the end of the heating tube. The other end of the mandrel is constructed for applying a suitable tool. The pulling mandrel 3 is surrounded by a hydraulic linear drive 10 and a hydraulic clamping piston 20. A cylinder or housing 11 of the hydraulic drive 10 is fastened to a mounting plate 4 which in turn is clamped to the tube sheet 1 by means of non-illustrated fast-acting clamping elements.

The hydraulic drive 10 is substantially formed of the cylinder housing 11 and a lifting piston 12, the inside of which rests against an inner sleeve 13. The lifting piston 12 has a lifting space which is closed off toward the mounting plate by the ring 14. Two hydraulic connections 15 and 16 are provided in the cylinder or housing 11, through which a hydraulic liquid can be fed under pressure for moving the lifting piston 12 in one direction or the other.

The lifting piston 12 is bolted to a cylindrical extension of the cylinder or housing of the clamping piston 20. This cylindrical extension is located at a cover 21 which, together with a cover 23, a housing part 22 and a clamping bushing 29, forms the housing of the clamping piston 20. Within the housing part 22 and the cover 23, the two lifting pistons 24 and 25 are disposed. The lifting piston 24 pushes against the narrow ends of three clamping jaws 26 disposed on a pitch circle, while the lifting piston 25 pushes against the wide ends of these clamping jaws. In the released condition, the clamping jaws 26 are pushed outward against the clamping bushing 29 by means of compression springs 30. Hydraulic connections 27 and 28 are provided for driving the lifting pistons 24 and 25.

The pulling mandrel 3 is furthermore provided with cylinder ringshaped recesses 5, in which the clamping jaws 26 can engage.

During the operation of the tool, the clamping jaws 26 are first clamped to the pulling mandrel 3 by driving the lifting piston 25. Subsequently, the lifting piston 12 is exposed to pressure from the hydraulic connection 15, the heating tube section 2 being pulled from the tube sheet 1 by a corresponding distance.

Thereupon, the lifting piston 25 is released and the lifting piston 24 is operated, so that the clamping between the clamping piston 20 and the pulling mandrel 3 is released. Pressure is subsequently applied to the lifting piston 12 from the hydraulic aperture 16 and brings the clamping piston 20 into a new position relative to the pulling mandrel. The stroke of the lifting piston 12 is advantageously chosen in this case in such a way that the clamping jaws 26 come to rest against the pulling mandrel in a respective cylinder ring-shaped recess 5 when the lifting piston 25 is oeprated.

After repeated step-wise operation of the lifting pistons 25, 12 and 24, the heating tube section 2 is pulled from the tube sheet 1. During the last operation of the lifting piston 24, the pulling mandrel 3 is seized manually or by remote control and is removed from the tool together with the heating tube section 2. If the pulling mandrel had already been removed before, only the corresponding heating tube section is seized and removed.

The foregoing is a description corresponding to German Application No. G 84 22 476.2 dated July 26, 1984, the International priority of which is being claimed for the instant application and which is hereby made part of this application. Any discrepancies between the foregoing specification and the aforementioned corresponding German application are to be resolved in favor of the latter.

I claim:

1. Tool for pulling heating tube sections from a tube sheet of a steam generator, comprising a threaded pulling mandrel of a given length with threads screwed to the heating tube section and cylinder ring-shaped recesses staggered in the longitudinal direction of said mandrel, a mounting plate fixed to the tube sheet, a hydraulic linear drive having a cylinder fastened to said mounting plate and a first lifting piston, hydraulic clamping means having a cylinder surrounding said mandrel and being fastened to said first lifting piston, means in the form of wedge-shaped clamping jaws having wide and narrow ends and being movable in longitudinal direction of said mandrel for engaging in said recesses in said mandrel over said given length of said mandrel, for engaging said clamping means with said mandrel and for engaging said clamping means with the heating tube section after said mandrel has been pulled beyond said clamping jaws, and second and third hydraulic lifting pistons of said clamping piston, said second lifting piston being in the form of means resting against said narrow ends of said clamping jaws for releasing said clamping jaws and said third lifting piston being in the form of means resting against said wide ends of said clamping jaws for bracing said clamping jaws.

* * * * *